United States Patent [19]

Kajioka et al.

[11] Patent Number: 4,987,296
[45] Date of Patent: Jan. 22, 1991

[54] RAIN SENSOR WITH IMPROVED AVOIDANCE OF REFLECTED LIGHT

[75] Inventors: Hideki Kajioka, Akashi; Yasuhiro Fujita; Keiji Fujimura, both of Kobe, all of Japan

[73] Assignee: Fujitsu Ten Limited, Hyogo, Japan

[21] Appl. No.: 392,269

[22] Filed: Aug. 10, 1989

[30] Foreign Application Priority Data

Aug. 11, 1988 [JP] Japan .................. 63-106144[U]

[51] Int. Cl.$^5$ .................. G01V 9/04; G08B 21/00
[52] U.S. Cl. .................. 250/222.1; 340/602
[58] Field of Search .................. 250/222.1, 222.2, 221, 250/239; 340/602; 73/171

[56] References Cited

U.S. PATENT DOCUMENTS

| 3,648,054 | 3/1972 | Nance | 250/223 R |
| 4,737,634 | 4/1988 | Sasaki et al. | 250/222.1 |

FOREIGN PATENT DOCUMENTS

| 0170984 | 2/1986 | European Pat. Off. | 250/222.1 |
| 1269936 | 6/1968 | Fed. Rep. of Germany | 250/222.2 |
| 0231439 | 10/1986 | Japan | 340/602 |

*Primary Examiner*—David C. Nelms
*Assistant Examiner*—Michael Messinger
*Attorney, Agent, or Firm*—Wenderoth, Lind & Ponack

[57] ABSTRACT

A rain sensor operates such that when a raindrop cuts off a direct light beam from a transmitter to a detector, the output level of the detector is lowered. A convex member is disposed to prevent a portion of the light emitted from the transmitter from reflecting and then reaching the detector. Thus, detecting error due to such reflected light is reduced.

10 Claims, 4 Drawing Sheets

RAIN SENSOR WITH IMPROVED AVOIDANCE OF REFLECTED LIGHT

BACKGROUND OF THE INVENTION

1. Field of the Invention

The present invention relates to an optical space monitoring type rain sensor.

2. Description of the Prior Art

FIG. 1 illustrates a structural example of a conventional space monitoring type rain sensor. This sensor is mounted, for example, on a motor vehicle, and is used with a so-called automatic windshield wiper drive control system for automatically regulating the intervals of wiping operation depending on the amount of sensed precipitation. A transmitter 1 and a detector 2 are disposed opposed to each other, and they are installed so that both the optical axes thereof coincide with each other. When a direct light beam L1 passing from the transmitter 1 to the detector 2 is cut off or interrupted by an obstacle 4 such as a raindrop such occurrence is detected as a drop of the level of reception light output (amplitude modulation) as shown in FIG. 2 (2). FIG. 2 (1) shows an output level when the pulse-modulated direct light L1 is received directly, i.e. without interruption.

Since the amplitude modulation amount $\Delta V1$ in FIG. 2 (2) is proportional to the shielding area of the obstacle 4, when $\Delta V1$ is large, it indicates a large raindrop, and when small it indicates a small raindrop.

However, since the light beam from the transmitter 1 has a certain spread, there is also other light L2 directed toward a casing 3. Accordingly, when a reflected light beam L3 of L2 enters the detector 2, if there is the same obstacle 4, the amplitude modulation amount $\Delta V2$ becomes smaller than the above $\Delta V1$, as shown in FIG. 2 (3), and thus there will occur an error in detention, i.e. $\Delta V2$ indicates less water than actually is present may occur. A similar phenomena may also occur, when the optical axis of the transmitter 1 becomes deviated.

Hitherto, in order to reduce this problem, as shown in FIG. 3, formation of the reflected light L3 into the detector 1 is prevented by increasing the height H of installation of the transmitter 1 and detector 2, or roughening the surface of the casing (surface embossing, undulations).

In the method shown in FIG. 3, however, the outer size of the sensor is increased, mounting is restricted and appearance may not be always favorable. Furthermore, by roughening the surface of the casing 3, wax or dust may deposit, the surface may be easily made to appear dirty, and this is not desirable for appearance.

SUMMARY OF THE INVENTION

To solve the above problems, hence, it accordingly is a primary object of the invention to provide a novel and improved rain sensor.

It is other object of the invention to provide a rain sensor capable of reducing the detecting error due to reflection of light on the surface of a casing or surrounding area of the detector.

To achieve the above objects, the rain sensor of the invention comprises:
a light transmitter,
a detector disposed at a position spaced from the transmitter for receiving light from the transmitter,
a support member extending between the transmitter and the detector so as to support the transmitter and the detector, and
a protuberance projecting from the support member, at a position between the transmitter and the detector, toward the optical axis of the transmitter and detector but spaced from such the optical axis.

In a preferred embodiment, the protuberance is disposed at a position equally spaced from both the light emitting plane of the transmitter and the light receiving plane of the detector, along the optical axis therebetween.

Furthermore, the support member preferably is a casing for integrally accommodating the transmitter and the detector. Moreover, the rain sensor according to the invention comprises:
a light transmitter,
a detector disposed at a position spaced from the transmitter for receiving light from the transmitter, and
a support member extending between the transmitter and the detector so as to support the transmitter and the detector, wherein
a portion of the support member at a middle position between the transmitter and the detector is bulged.

The output level of the detector is lowered when direct light from the transmitter to the detector is cut off by a raindrop, and according to the invention, a convex member is disposed at the casing in order to prevent part of the light emitted from the transmitter from being reflected by the casing to enter or reach the detector.

Furthermore, in the rain sensor according to the invention, the convex part may be formed nearly at equal distances from both the transmitter and the detector. Thereby, in case the of installation of the transmitter and detector are equal, light reflecting from the casing surface at a reflection angle is prevented from reaching the detector when such reflection angle is equal to the angle of incidence from the transmitter.

By the provision of such protrusion or convex member, the—; reflected member is prevented from reaching the detector, and a the detecting error due to such reflected light will be decreased. Further, since the heights of the transmitter and detector may be reduced, appearance is improved, and the surface of the casing may be smooth so as to be free from the problem of contamination.

Thus, according to the invention, by suppressing the effects of reflection from the casing surface or surrounding area errors in detention can be reduced. Furthermore, lowering of sensor sensitivity and fluctuations due to deviation of the optical axis of the transmitter can be reduced. Still further, the appearance of the sensor is improved, and the mounting thereof is not restricted.

BRIEF DESCRIPTION OF THE DRAWINGS

These and other objects of the invention, as well as the features and advantages thereof, will be better understood and appreciated from the following detailed description and the accompanying drawings, in which.

DETAILED DESCRIPTION OF THE PREFERRED EMBODIMENTS

Figure 4:
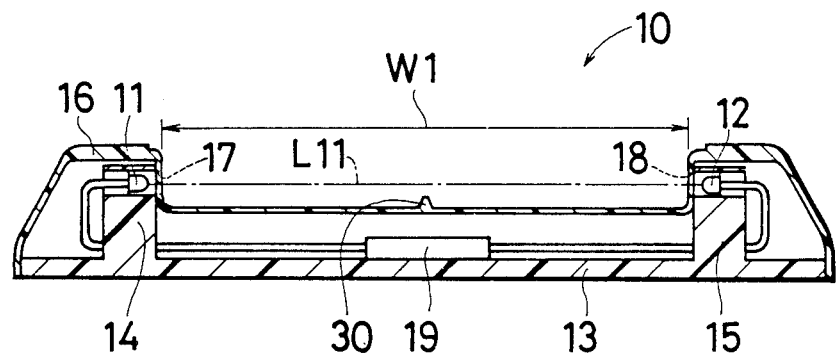
FIG. 4 is a sectional view of a rain sensor according to one embodiment of the invention.
Figure 5:
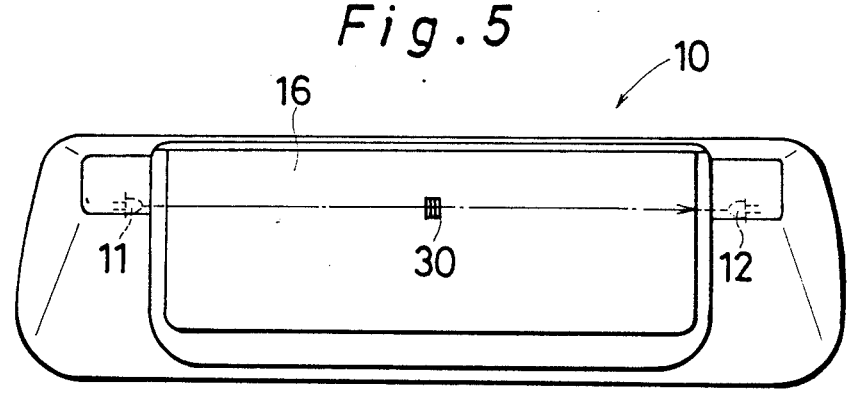
FIG. 5 is a plan view of such rain sensor.
Figure 6:
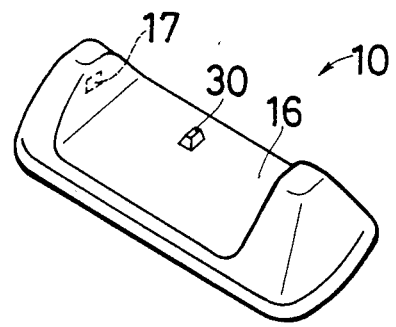
FIG. 6 is a perspective view of such rain sensor.

Referring now to the drawings, some of the preferred embodiments of the invention are described in details below. FIG. 4 is a sectional view of a rain sensor 10 in one embodiment of the invention, FIG. 5 is a plan view thereof, and FIG. 6 is a perspective view thereof.

A transmitter 11 and a detector 12 are opposedly mounted on spaced support posts 14, 15 erected on a base 13. The transmitter 11 is made of a light emitting diode or the like, and its radiant light is emitted into a monitoring space W1 through a hole 17 formed in a casing 16. The radiant light passing through this monitoring space W1 passes through a hole 18 formed in the casing 16, and enters the detector 12 made of a photo diode or the like. When a raindrop cuts off or interrupts an optical path L11, which is formed as above, the presence of such raindrop will be detected.

Figure 7:
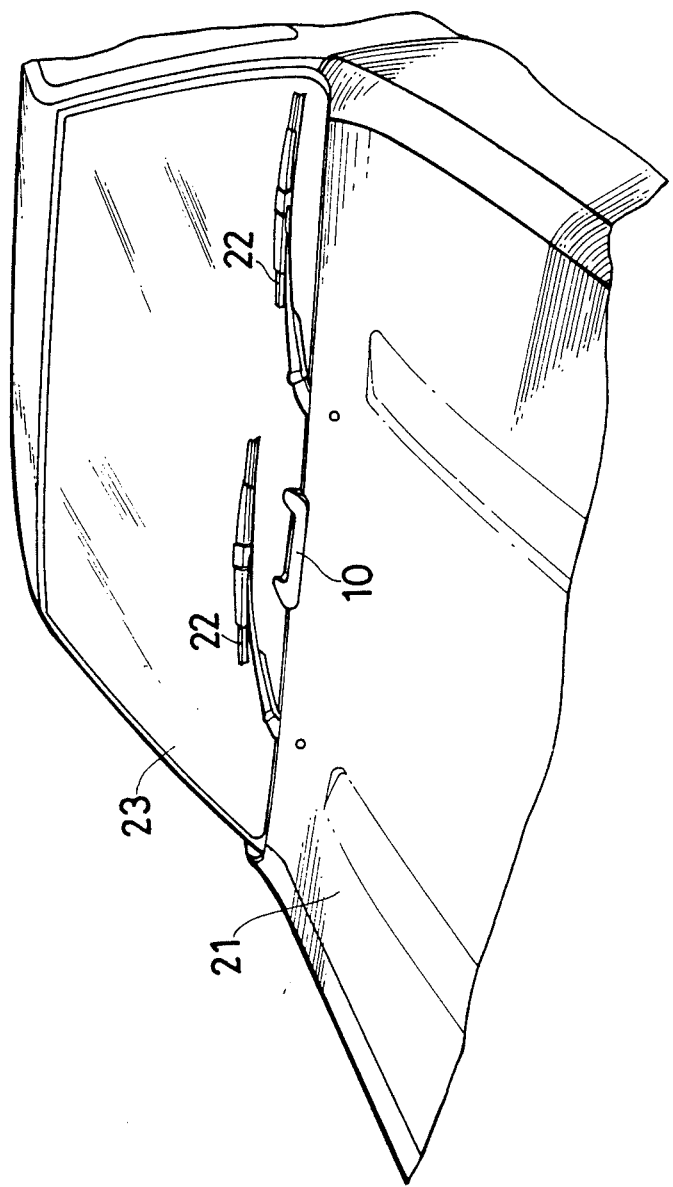
FIG. 7 is a perspective view showing such rain sensor being mounted on a body of a motor vehicle.

The transmitter 11 and the detector 12 are connected to a control circuit 19 provided in the casing 16, and this control circuit 19 is operable to offset the quantity of reflected light emission or light from other sources. The rain sensor 10 is mounted on a hood 21 of the body of a motor vehicle (FIG. 7), and the output from the detector 12 is fed into an automatic windshield wiper drive control system which is not shown in the drawings. The automatic wiper control system calculates the quantity of precipitation present on the basis of the output from the detector 12, and drives wiper blades 22 at intervals suited to the detected obtained precipitation, thereby wiping off the raindrops depositing on a windshield 23.

Figure 8:
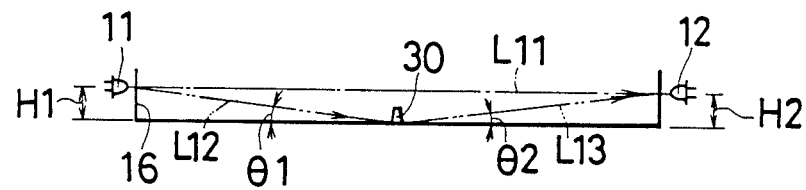
FIG. 8 is a diagram explaining the principle of the invention.

FIG. 8 is a diagram explaining the principle of the invention. The light beam from the transmitter 11 is radiated at a spread or widened angle. Therefore, the detector 12 receives both light passing directly along the optical path L11 which is the optical axis of the transmitter 11 and the detector 12, and reflected light through optical paths L12, L13 reflected from the surface of the casing 16. Accordingly, in this embodiment, a protuberance 30 extending toward the optical path L11 and not so high as to cut off the optical path L11 is formed on the casing 16.

This protuberance 30 is disposed on a projected line of the optical path L11 on the surface of the casing 16, and when the mounting height H1 of the transmitter 11 and the mounting height H2 of the detector 12 are identical, it is disposed at the middle of such projected line.

Generally, the angle of incidence $\theta_1$ of the incident light from the transmitter 11 onto the surface of the casing 16 via the optical path L12, and the reflected angle $\theta_2$ of light reflected from the surface of the casing 16 via the optical path L13 are equal to each other.

Therefore, when the mounting heights H1, H2 differ, the position of the protuberance 30 on the projected line may be determined according to a ratio of the mounting heights H1, H2.

The protuberance 30 may be formed either integrally with the casing 16, or independently. In this embodiment, protuberance 30 is formed in a wedge shape as a part of the casing 16, which makes it possible also to reduce the reflection on the surface of protuberance 30.

Figure 1:
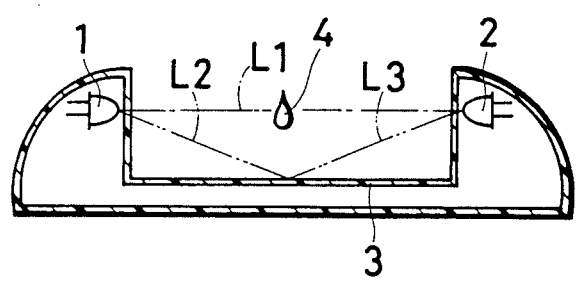
FIG. 1. is a sectional view of a conventional rain sensor.
Figure 2:
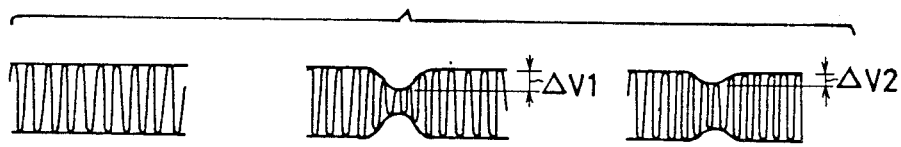
FIG. 2 illustrates operation waveform diagrams thereof
Figure 3:
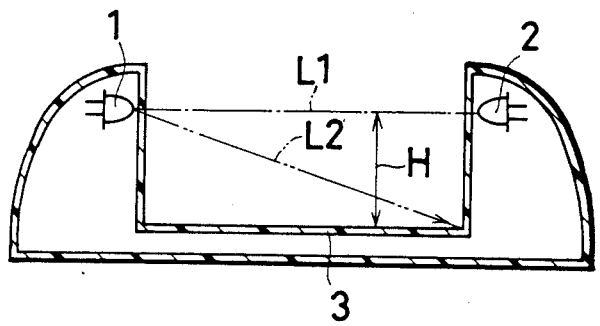
FIG. 3 is a sectional view of another conventional rain sensor.

Thus, in the rain sensor 10 according to the invention, since the protuberance 30 for preventing reflected light from reaching the detector 12 is formed on the surface of the casing 16, incident light from the transmitter 11 via the optical path L12 is not reflected from the surface of the casing 16 to enter the detector 12. Thus, the detecting error of the raindrop diameter as shown in FIG. 2 (3) will be reduced.

Besides, the mounting heights H1, H2 can be kept low, the size of the detector can be reduced without sacrificing appearance, and restrictions on the mounting position of the rain sensor 10 can be lessened. Furthermore, the surface of the casing 16 can be formed smoothly, and deposits of contamination may be prevented.

Figure 9:
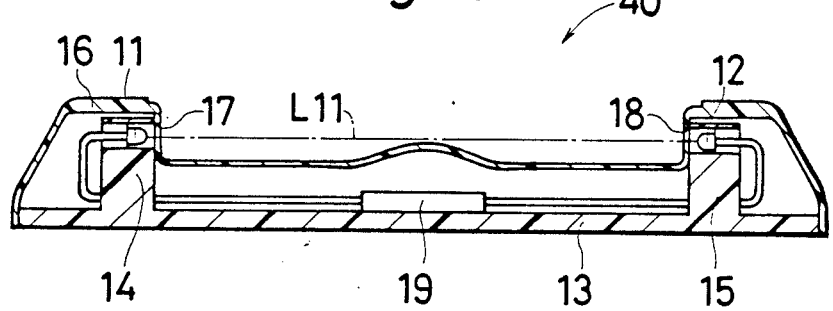
FIG. 9 is a sectional view of a rain sensor according to other embodiment of the invention.
Figure 10:
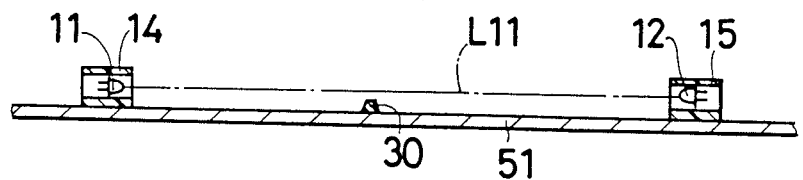
FIG. 10 is a sectional view of a further different embodiment of the invention.

FIG. 9 is a sectional view of a rain sensor 40 in a different embodiment of the invention. This embodiment is similar to the foregoing embodiment, and the same reference numbers are employed for corresponding parts. In this sensor 40, instead of the protuberance 30, the portion of the casing 16 corresponding to the position of the protuberance 30—; is bulged. As a result, light by the surface of the casing 16 may be prevented from reaching the detector. Furthermore, as shown in FIG. 10, in the case where the support posts 14, 15 are directly mounted on the body 51 of a motor vehicle, such as a front grille thereof, the protuberance 30 may be formed on the body 51.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A rain sensor assembly comprising:
 a light transmitting element mounted in means to support said light transmitting element to project above a surface;
 a light receiving element mounted in means to support said light receiving element to project above a surface at a position spaced from said light transmitting element such that light transmitted directly from said light transmitting element passes along a rectilinear path spaced above the surface to reach said light receiving element;
 said assembly being substantially open and unconfined on opposite sides of said rectilinear path between said support means of said elements above the surface;
 such that raindrops are allowed to enter the space between said support means in mutually perpendicular directions, whereby any such raindrop that interrupts said direct light along said path from said light transmitting element reduces the amount of direct light received by said light receiving element; and
 means for preventing incident light transmitted from said light transmitting element along a path directed toward the surface from reflecting from the surface and reaching the light receiving element, said preventing means comprising a portion to be positioned between said elements to project upwardly from the surface to intercept said incident light while not interfering with said direct light along said rectilinear path.

2. An assembly as claimed in claim 1, comprising a casing forming said surface.

3. An assembly as claimed in claim 2, wherein said support means of said elements form portions of said casing and project from said surface, and said casing is open and unconfined above said surface except for said support means.

4. An assembly as claimed in claim 2, wherein said upwardly projecting portion comprises a protuberance formed on said surface.

5. An assembly as claimed in claim 2, wherein said upwardly projecting portion comprises an upwardly convex buldge in said surface.

6. An assembly as claimed in claim 2, wherein said upwardly projecting portion is formed at the middle of a line formed by projection of said rectilinear path vertically onto said surface.

7. An assembly as claimed in claim 1, comprising a portion of a vehicle body forming said surface.

8. An assembly as claimed in claim 7, wherein said upwardly projecting portion comprises a protuberance formed on said surface.

9. An assembly as claimed in claim 7, wherein said upwardly projecting portion comprises an upwardly convex bulge in said surface.

10. An assembly as claimed in claim 7, wherein said upwardly projecting portion is formed at the middle of a line formed by projection of said rectilinear path vertically onto said surface.

* * * * *